(12) United States Patent
Smith, II et al.

(10) Patent No.: US 8,677,850 B2
(45) Date of Patent: Mar. 25, 2014

(54) ROLLING MILL DRIVE WITH OIL RECIRCULATION SYSTEM HAVING AIR PRESSURE FEATURE

(75) Inventors: Frank L. Smith, II, Sevenmile, OH (US); Mohamad Daher, Edgewood, KY (US)

(73) Assignee: Xtek, Inc., Cincinnati, OH (US)

( * ) Notice: Subject to any disclaimer, the term of this patent is extended or adjusted under 35 U.S.C. 154(b) by 371 days.

(21) Appl. No.: 13/202,837

(22) PCT Filed: Mar. 17, 2010

(86) PCT No.: PCT/US2010/027555
§ 371 (c)(1),
(2), (4) Date: Sep. 23, 2011

(87) PCT Pub. No.: WO2010/107849
PCT Pub. Date: Sep. 23, 2010

(65) Prior Publication Data
US 2012/0006138 A1    Jan. 12, 2012

Related U.S. Application Data

(60) Provisional application No. 61/160,864, filed on Mar. 17, 2009.

(51) Int. Cl.
*F16H 57/04* (2010.01)
(52) U.S. Cl.
USPC ............... 74/467; 74/606 R; 184/7.1; 277/431
(58) Field of Classification Search
USPC .................. 72/229, 236; 74/467, 606 R, 607; 184/7.1, 55.1–57; 277/304, 388, 431, 277/432, 552; 464/106–159
See application file for complete search history.

(56) References Cited

U.S. PATENT DOCUMENTS 2,957,713 A * 10/1960 Herbenar ................ 403/125
3,033,595 A *  5/1962 Bard .................... 285/187
(Continued)

FOREIGN PATENT DOCUMENTS

CN        1203138       12/1998
CN        1767917        5/2006
(Continued)

OTHER PUBLICATIONS

PCT, International Search Report and Written Opinion, International Application No. PCT/US2010/027555 (May 14, 2010).

(Continued)

*Primary Examiner* — Troy Chambers
*Assistant Examiner* — Valentin Craciun
(74) *Attorney, Agent, or Firm* — Thompson Hine LLP (57) ABSTRACT

A gear spindle includes a shaft having a first gear cavity at a first end, an oil delivery path for delivering oil to the first gear cavity and an oil return path for carrying oil away from the first gear cavity. A first seal assembly is associated with the first end of the shaft for limiting leakage of oil from the first gear cavity, the first seal assembly including a sealing interface having one side in fluid communication with the first gear cavity and an opposite side in fluid communication with a fluid delivery path. The fluid delivery path may be connected to a source of pressurized air for reducing pressure differential across the sealing interface.

14 Claims, 8 Drawing Sheets

(56) References Cited

U.S. PATENT DOCUMENTS

| | | | |
|---|---|---|---|
| 3,162,471 A * | 12/1964 | Mazziotti | 403/38 |
| 3,165,339 A * | 1/1965 | Faccon | 285/263 |
| 3,359,952 A | 12/1967 | Jones et al. | |
| 3,698,725 A | 10/1972 | Klabunde | |
| 3,724,238 A * | 4/1973 | Retali et al. | 464/106 |
| 3,781,147 A | 12/1973 | Sato | |
| 3,975,123 A * | 8/1976 | Schibbye | 418/97 |
| 4,063,743 A | 12/1977 | Petros | |
| 4,103,903 A | 8/1978 | Capriotti et al. | |
| 4,189,157 A * | 2/1980 | Mahan et al. | 277/301 |
| 4,214,708 A * | 7/1980 | Lacchia | 239/703 |
| 4,524,917 A | 6/1985 | Williams | |
| 4,534,569 A * | 8/1985 | Ishitani et al. | 277/351 |
| 4,945,620 A | 8/1990 | Dassler | |
| 5,040,805 A * | 8/1991 | Ozora | 277/627 |
| 5,711,709 A * | 1/1998 | McCoy | 464/106 |
| 5,836,753 A | 11/1998 | Takei et al. | |
| 5,921,731 A | 7/1999 | Chandrasekar | |
| 6,146,020 A * | 11/2000 | Innis, Jr. | 384/486 |
| 6,312,022 B1 * | 11/2001 | Brophy et al. | 285/268 |
| 6,352,265 B1 * | 3/2002 | Ha | 277/432 |
| 6,802,511 B1 | 10/2004 | Martins et al. | |
| 7,198,303 B2 * | 4/2007 | Brophy et al. | 285/267 |
| 7,396,017 B2 * | 7/2008 | Orlowski et al. | 277/412 |
| 2004/0207162 A1 * | 10/2004 | Kubota et al. | 277/650 |
| 2007/0123358 A1 * | 5/2007 | Wormsbaecher | 464/145 |
| 2008/0001364 A1 | 1/2008 | Anderson et al. | |
| 2009/0275415 A1 * | 11/2009 | Prill et al. | 464/152 |
| 2011/0005839 A1 * | 1/2011 | Marchand et al. | 175/92 |
| 2012/0312600 A1 * | 12/2012 | Abbasi | 175/320 |

FOREIGN PATENT DOCUMENTS

| | | |
|---|---|---|
| CN | 1974096 | 6/2007 |
| CN | 1997494 | 7/2007 |
| CN | 200977577 | 11/2007 |
| CN | 101137465 | 3/2008 |

OTHER PUBLICATIONS

PCT, International Preliminary Report on Patentability, International Application No. PCT/US2010/027555 (Sep. 29, 2011).

* cited by examiner

ROLLING MILL DRIVE WITH OIL RECIRCULATION SYSTEM HAVING AIR PRESSURE FEATURE

CROSS-REFERENCES

This application claims the benefit of U.S. Provisional Application Ser. No. 61/160,864, filed Mar. 17, 2009.

TECHNICAL FIELD

This application relates generally to a rolling mill drive arrangement and, more particularly, to a recirculating oil system of a shaft of a rolling mill drive.

BACKGROUND

Oil recirculation systems have been used in the past in connection with rolling mill drive arrangements. One issue that occurs in connection with such arrangements is that of oil leakage. Accordingly, it would be desirable to provide a drive that limits or prevents such oil leakage.

SUMMARY

In one aspect, a gear spindle includes a shaft having a first gear cavity at a first end, an oil delivery path for delivering oil to the first gear cavity and an oil return path for carrying oil away from the first gear cavity. A first seal assembly is associated with the first end of the shaft for limiting leakage of oil from the first gear cavity, the first seal assembly including a sealing interface having one side in fluid communication with the first gear cavity and an opposite side in fluid communication with a fluid delivery path. The fluid delivery path may be connected to a source of pressurized air for reducing pressure differential across the sealing interface.

In another aspect, a method of providing oil recirculation in a rolling mill drive including a drive shaft with a roll mill drive end involves providing a recirculating flow of oil to and from a gear cavity of the roll mill drive end; providing a seal arrangement in connection with the gear cavity, the seal arrangement including a primary sealing interface having one side in fluid communication with part of the gear cavity; and delivering pressurized air to a space located to an opposite side of the primary sealing interface to act against gear cavity pressure.

In yet another aspect, a rolling mill drive includes a shaft having a driven end and a roll drive end, with a gear zone associated with the roll drive end. An oil delivery path delivers oil to the gear zone and an oil return path carries oil away from the gear zone. A seal assembly is associated with the roll mill end for limiting leakage of oil from the gear zone. The seal assembly includes components defining: a first cavity that receives oil from the gear zone, a first sealing interface having one side in communication with the first cavity, a second cavity in communication with an opposite side of the first sealing interface, a second sealing interface having one side in communication with the second cavity, wherein the second cavity includes pressurized air therein to counter oil pressure that builds up in the first cavity thereby limiting flow of oil across the first sealing interface so as to direct the oil primarily to the oil return path.

DETAILED DESCRIPTION

Figure 1:
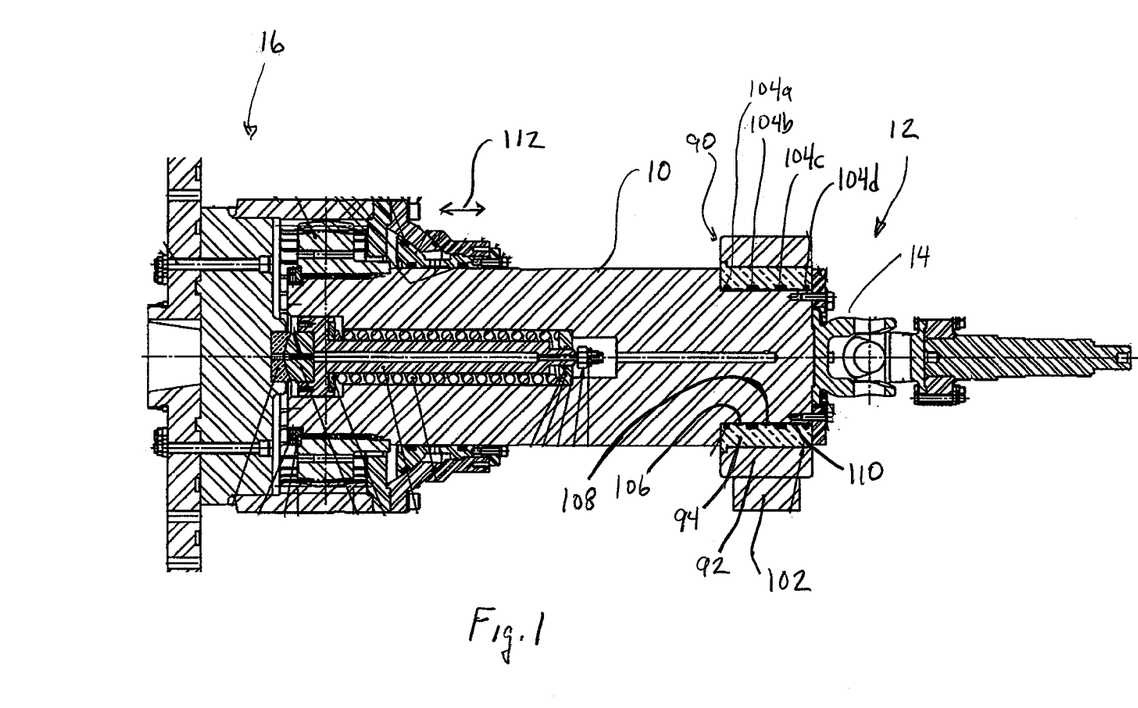
FIG. 1 is a cross-section of one embodiment of a drive shaft assembly of a rolling mill drive.
Figure 2:
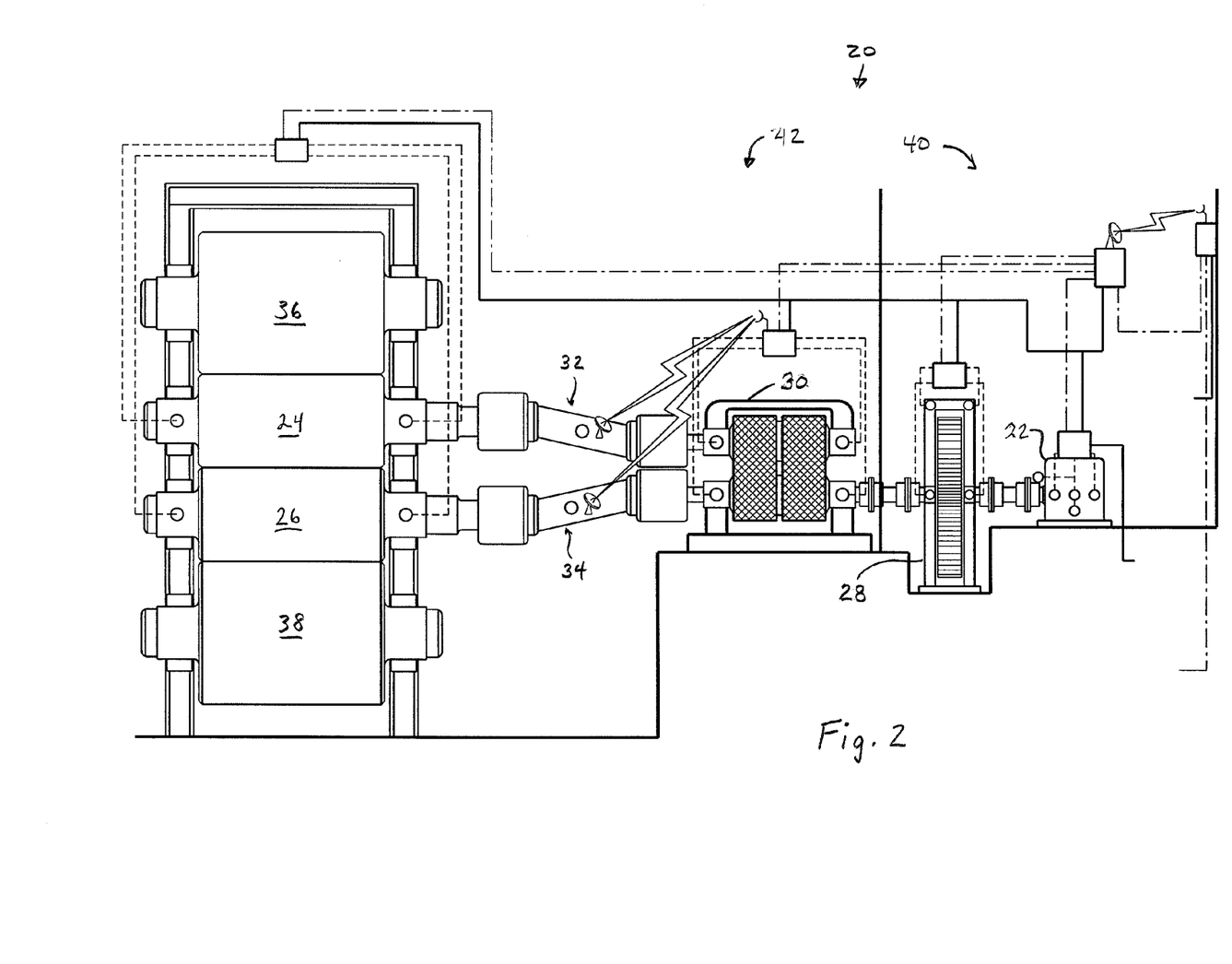
FIG. 2 is a plan view of one embodiment of a rolling mill drive.

Referring to FIG. 1, a rolling mill coupling arrangement is shown that includes a spindle shaft 10 with a motor end or driven end 12 at which drive rotation is applied to the shaft and a roll end 16 for connecting to a roll. The roll end of the shaft drives a hub gear, which in turn interacts with and drives a coupling gear. In the illustrated embodiment, the driven end of the shaft includes a U-joint assembly 14 to be coupled to a drive. However, in a typical spindle application the driven end of the shaft would include a hub gear arrangement similar to that of the roll end. In this regard, and by way of example only, reference is made to FIG. 2 showing a complete rolling mill drive arrangement in which the subject oil recirculation system and seal of the present application could be implemented. Specifically, a rolling mill drive train 20, e.g., for use in rolling metal such as steel is shown. Rolling mill drive train 20 includes a motor 22 that is operatively connected to work rolls 24 and 26 through a drive train power transmission that includes a gear reducer 28, pinion assembly 30 and couplings shown as gear spindles 32 and 34. Backup rolls 36 and 38 are located adjacent to and contact the work rolls 24 and 26 to form a nip through which a work piece (e.g., a metal plate) is fed during a rolling operation. The motor 22 and gear reducer 28 are located in a motor room portion 40 of a mill, while the pinion assembly 30, gear spindles 32, 34, work rolls 24, 26 and backup rolls 36, 38 are located in a mill portion 42 separated from the motor room portion 40.

Figure 3:
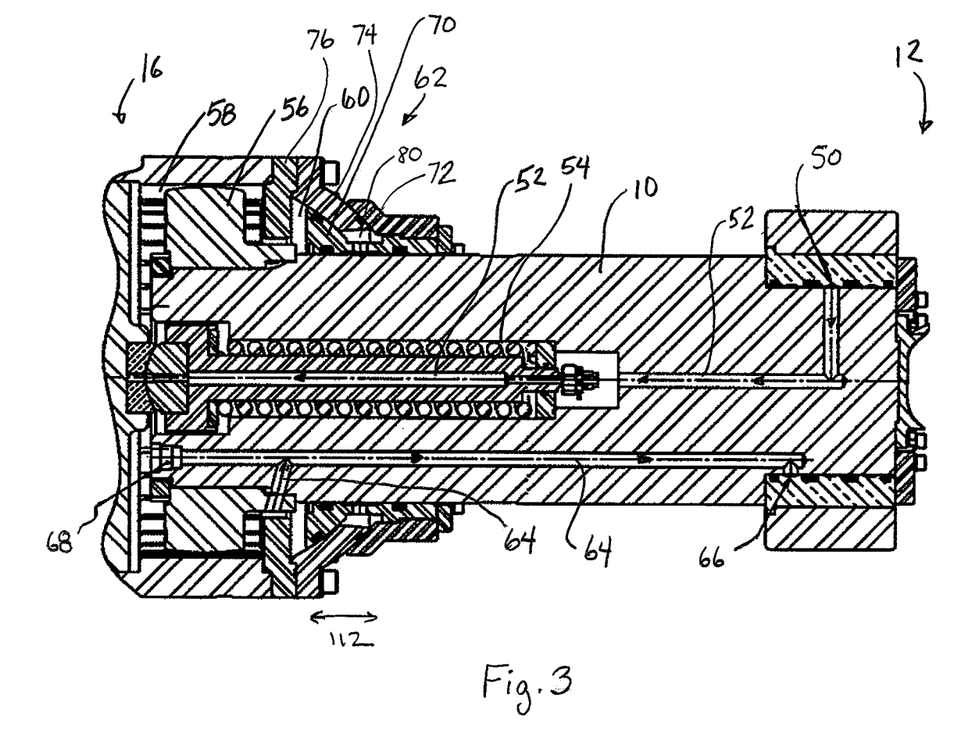
FIG. 3 is an enlarged partial cross-section of the assembly of FIG. 1 showing oil delivery and oil return paths.

Referring to FIG. 3, an oil recirculation system includes an oil input 50 (near the motor end 12). An oil path 52 extends axially along the spindle shaft and, in the illustrated embodiment, through and including an axial passage of the spring guide assembly 54. At the roll end 16 of the oil path 52 the oil moves radially outwardly to reach the interacting area of the hub gear teeth 56 and coupling gear teeth 58. After passing by the interacting teeth area, the oil moves into a primary cavity 60 adjacent a seal assembly 62. The oil in this region can enter and travel along an oil return path 64 that leads back to the motor end of the shaft where an oil output 66 is provided. The axial bore forming part of the oil return path 64 is sealed at its roll end with a plug 68.

Figure 4:
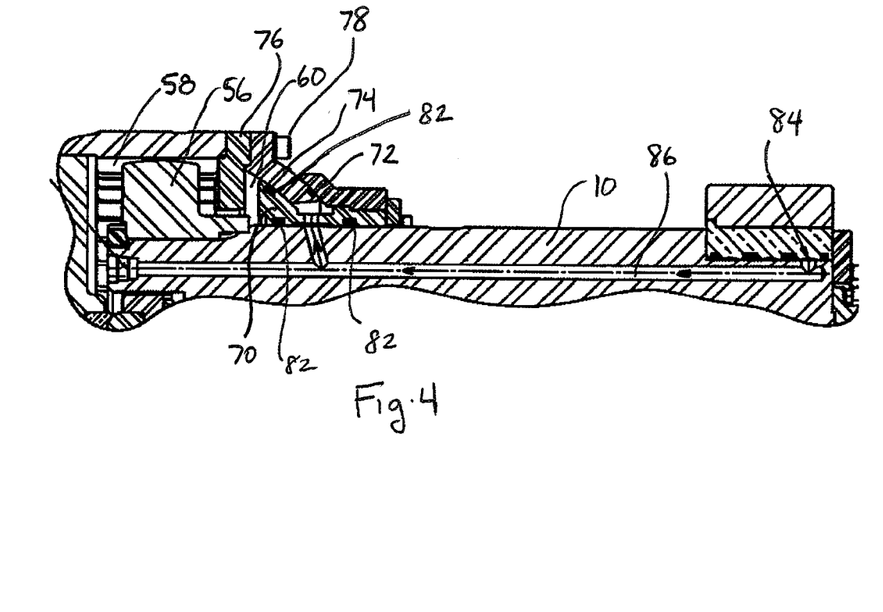
FIG. 4 is an enlarged partial cross-section of the assembly of FIG. 1 showing the air delivery path.
Figure 5:
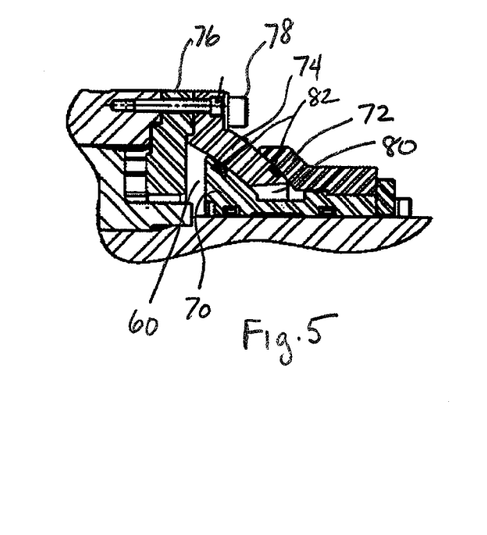
FIG. 5 is an enlarged partial cross-section showing the seal assembly of the rolling mill end of the shaft of FIG. 1.

Referring to FIGS. 4 and 5, the seal assembly includes spindle seal components 70 and 72 that are spaced apart and that generally rotate with the spindle shaft 12, and a coupling gear seal component 74 that is connected to rotate with the coupling gear (e.g., via an angle limiter 76 using screws/bolts 78) and extends into the space between spindle seal components 70 and 72. The seal components have curved (preferably arcuate surfaces as seen in 2 dimensional cross-section or partial spherical surfaces in 3 dimensions) that enable relative pivot between the coupling gear and the spindle shaft 12. Notwithstanding the presence of sealing rings 82, oil in the primary cavity 60 can migrate into a secondary cavity 80 along the surface to surface contact between component 74 and component 70 within the seal assembly, and then leak from the system along an oil leak path at the surface to surface contact between the coupling gear seal component 74 and spindle shaft seal component 72. However, any such leakage can be reduced or eliminated utilizing pressurized fluid delivery to the secondary cavity 80.

In this regard, a pressurized air input 84 is provided, along with a pressurized air path 86 that leads to the secondary cavity 80. Applying air pressure along this path and into the secondary cavity helps to prevent or limit any flow of oil from the primary cavity 60 into the secondary cavity 80, thus eliminating or reducing the probability of oil leakage from the secondary cavity 80 along the oil leakage path. The air pressure therefore causes substantially all of the circulating oil to flow along the oil return path 64 (see FIG. 3).

The function of this seal package is unique in that it equalizes pressure across the primary seal face (i.e., between the adjacent surfaces of components 70 and 74) with the use of air pressure. In some embodiments, it may be possible to utilize packed grease in secondary cavity 80 to achieve an effective retention of oil within the primary cavity 60. The seal design uses a secondary cavity which allows pressure to be equalized across the primary seal.

In the seal assembly 62 there is both a primary seal (the sealing interface between the adjacent surfaces of components 70 and 74—meant to seal oil) and a secondary seal (the sealing interface between the adjacent surfaces of components 72 and 74—meant to seal air or packed grease). For oil to leak out of the coupling the oil must cross both seals. The primary seal operates against a spherical surface that is intended to hold oil in the coupling while rotating at some axial angular misalignment. The secondary seal is meant to hold compressed air and/or packed grease in the secondary cavity.

The primary cavity 60 is, basically, part of the gear cavity adjacent to the primary seal that holds gear oil. The secondary cavity 80 is external to the gear cavity and is designed to resist leaking oil from entering the secondary cavity. The secondary cavity is pressurized with air and/or packed grease, which acts as a barrier to leaking oil from the gear cavity.

This oil is being pumped through the shaft, along path 52, into the gear cavity and develops internal gear cavity pressure. The gear cavity pressure tends to increase as the coupling rotates faster. The seal assembly is configured to resist oil leakage resulting from increased cavity pressure by inducing air pressure or pressurized grease on the opposite face or side of the primary seal. In essence, typically the oil would tend to leak out of the coupling because the pressure in the coupling is higher than the pressure outside the coupling. However, the pressurized secondary cavity 80 effectively stops the natural flow of leaking oil out of the gear cavity. Generally the gear cavity pressure increases with the rotating speed of the drive system. In a typical application the pressure of the air supplied to the secondary cavity may be selected so as to provide suitable results based upon the known highest speed for the drive system. Pressures in the range of 5 psi to 30 psi may typically be suitable, but variations are possible. Any suitable source or pressurized air may be used. As used herein the term "air" broadly encompasses any gaseous fluid (e.g., ambient air could be used, but other gaseous fluid mixtures could be used or a gaseous fluid made up of a single element could also be used).

Figure 6:
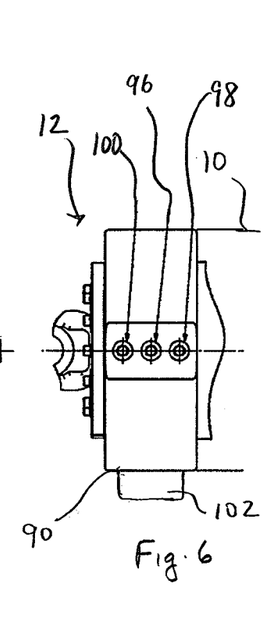
FIG. 6 is an elevation view of the lube ring arrangement of the assembly of FIG. 1.

Referring to FIGS. 1 and 6, in the illustrated embodiment oil delivery, oil return and air delivery are achieved through use of a lube ring 90 having an outer collar 92 and an inner collar 94. The lube ring includes ports 96, 98 and 100 for oil input, oil output and air input respectively, and to which hoses, piping or other suitable flow means may be coupled during operation. During operation, a retaining block 102 coupled to the lube ring prevents the lube ring from rotating while the shaft 10 rotates. Sliding contact occurs between the radially inner surface of the lube ring and the radially exterior surface of the shaft 10. Spaced apart annular seals 104a, 104b, 104c and 104d are seated within annular recesses of the inner collar surface and establish respective annular fluid zones 106, 108 and 110 about the shaft 10. Port 96 leads to zone 108 to deliver oil to the zone 108 and to the oil inlet 50 that is located in zone 108. Port 98 leads to zone 106 to receive recirculated oil from the oil outlet 66 that is located in zone 106. Port 100 leads to zone 110 to deliver air to air inlet 84 that is located in zone 110.

Aside from the fundamental function of the seal assembly, it is important that the seal package, as a unit, float axially on the shaft, as well as accommodate angular misalignment. The whole seal package is built to slide on the shaft directionally as indicated by arrow 112. The spring guide assembly 54 urges the seal package toward the roll end 16 of the shaft 10. When the coupling is engaged with a driven member (e.g., a roll drive shaft) the casing and seal package are moved slightly toward the driven end 12 of the shaft. The pivot connection of the seal component 74 between seal components 70 and 72, utilizes a series of spherically curved surfaces to create an interlocking ball and socket arrangement that has within it an internal chamber (which is the secondary cavity 60). This geometry allows the coupling gear to pivot and translate, along with component 74, while maintaining uniform gaps between seals and sealing surfaces of the seal package. When the coupling is disengaged from the driven member the spring guide assembly 54 pushes the coupling and seal package along the shaft 10 toward the roll end 16 and the angle limiter 76 interacts with the hub gear teeth 56 to limit downward pivot of the coupling that would tend to occur as a result of gravity.

Figure 7:
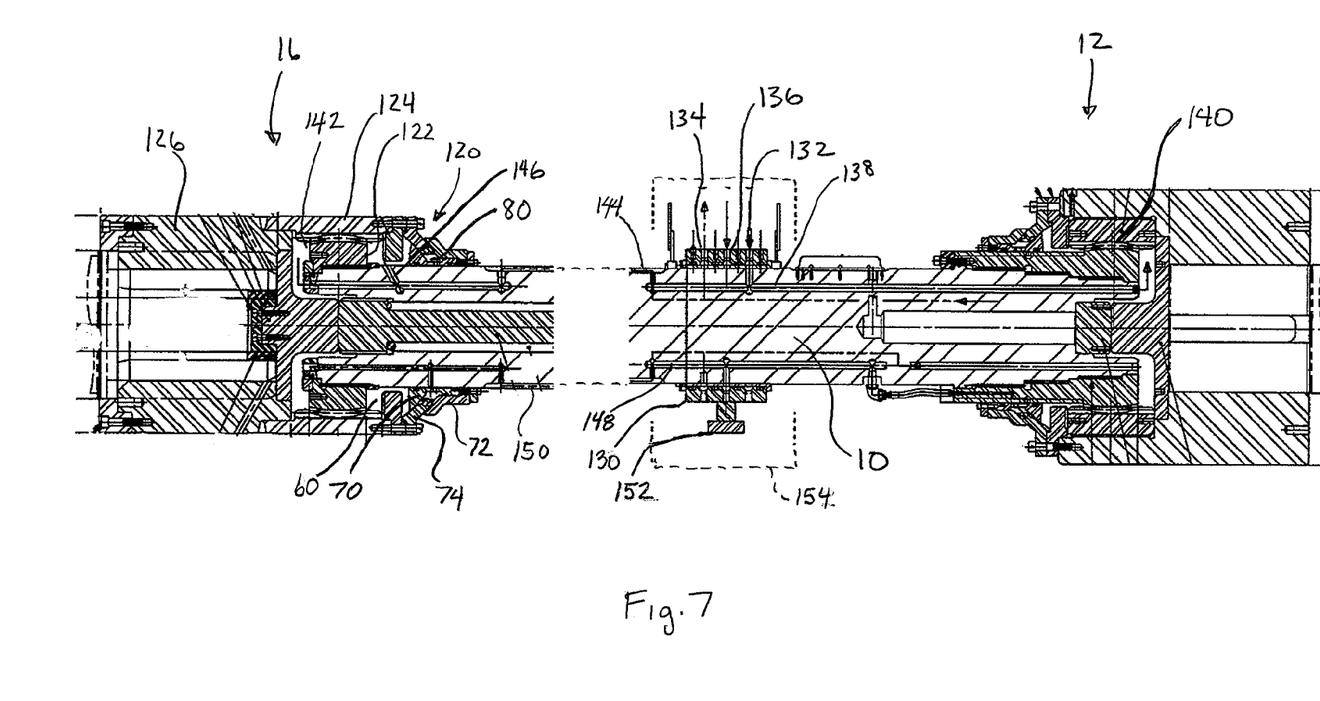
FIG. 7 shows a cross-section of an alternative embodiment of a drive shaft assembly for a rolling mill drive.

Referring now to FIG. 7, another embodiment of a rolling mill shaft and coupling arrangement is shown. The shaft 10 includes a driven end 12 and rolling mill end 16. The roll end of the shaft includes a seal package 120, hub 122 and coupling 124, all arranged to drive a casing 126 that engages into the open end of the coupling. In turn, the casing engages with the roll neck of a work roll. The seal package includes similar seal components 70, 72 and 74 to the above embodiment and both a primary cavity 60 and secondary cavity 80 are formed. A lube ring 130 includes an oil input port 132, an oil output port 134 and an air input port 136. The Oil input port 132 feeds oil to an oil path 138 that delivers the oil forward to both the hub and coupling gear region 142 for lubrication and to the opposite, driven end of the shaft 10 for lubricating its geared region 140. A portion 144 of the oil path leading to geared region 142 is formed by a groove on the external surface of the shaft, which groove may be suitably covered by a plate or other structure for sealing. The oil return port 134 is connected to receive oil from an oil return path 146 (only a portion of which is shown FIG. 7) that extends from the primary cavity 60. The air input port 136 leads to an air flow path 148 that connects to the secondary cavity 80 for pressurizing it in the manner described above. As with path 138, a portion 150 of the path 148 may be formed by a recess or groove in the surface of the shaft, with the groove being sealed by a plate or other overlaying structure. In an alternative arrangement, the cavity 80 may be packed with grease. The lube ring 130 includes an anti-rotation lug 152 that interacts with structure (not shown) to prevent the lube ring from rotating during rotation of the shaft 10. A catch box 154 is shown schematically in FIG. 7 and is configured to catch any oil that is thrown off in the vicinity of the lube ring 130. The embodiment of FIG. 1 may include a similar catch box. As with the embodiment of FIG. 1, suitable hoses, piping or other flow means would be coupled to the lube ring ports during operation for carrying the fluids.

Figure 8:
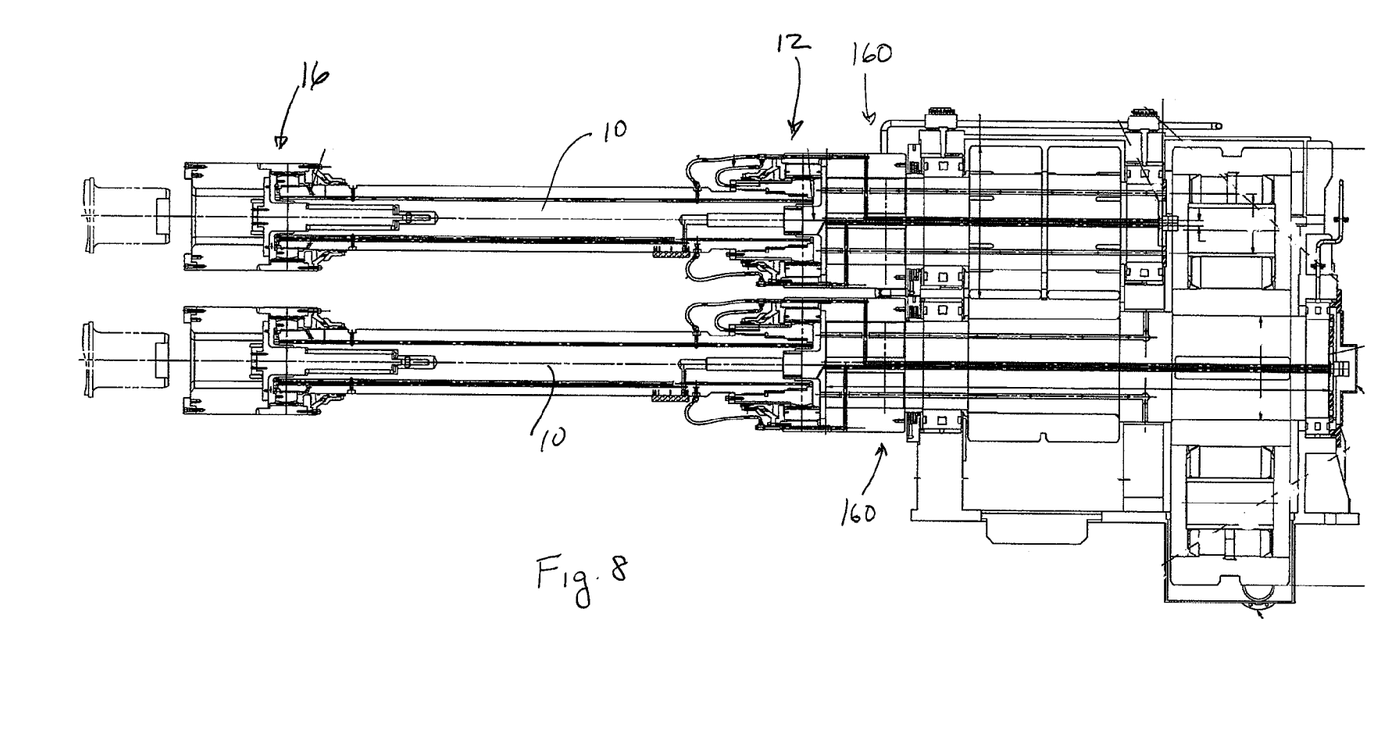
FIG. 8 is a plan view of an alternative embodiment of side by side drive shaft assemblies of a rolling mill drive.
Figure 9:
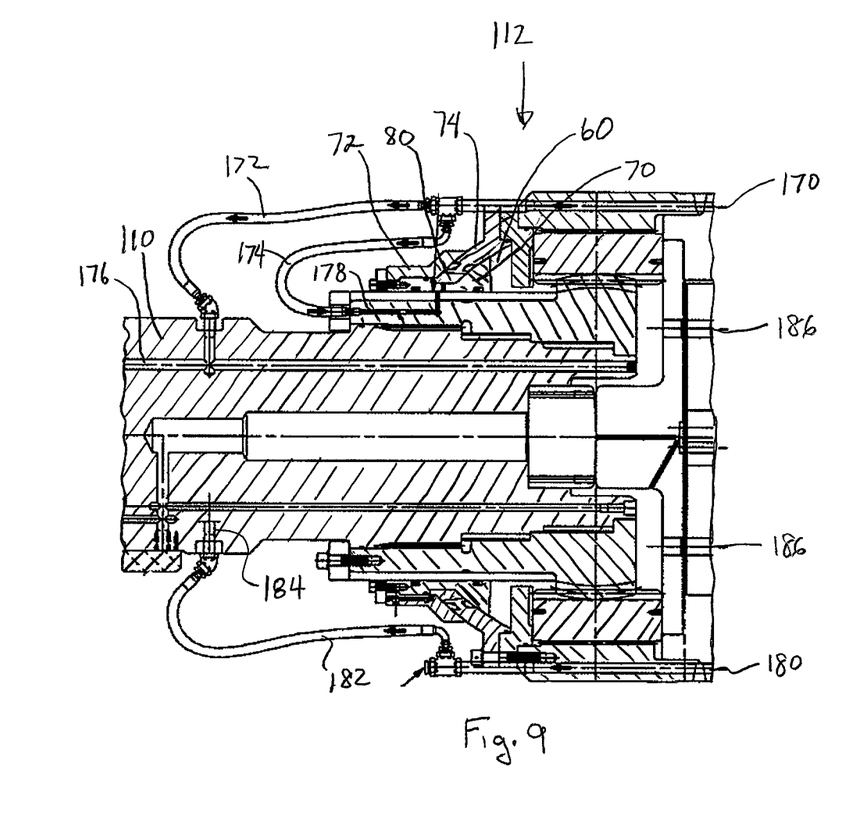
FIG. 9 is an enlarged partial view of the driven end of one shaft of the embodiment of FIG. 8.
Figure 10:
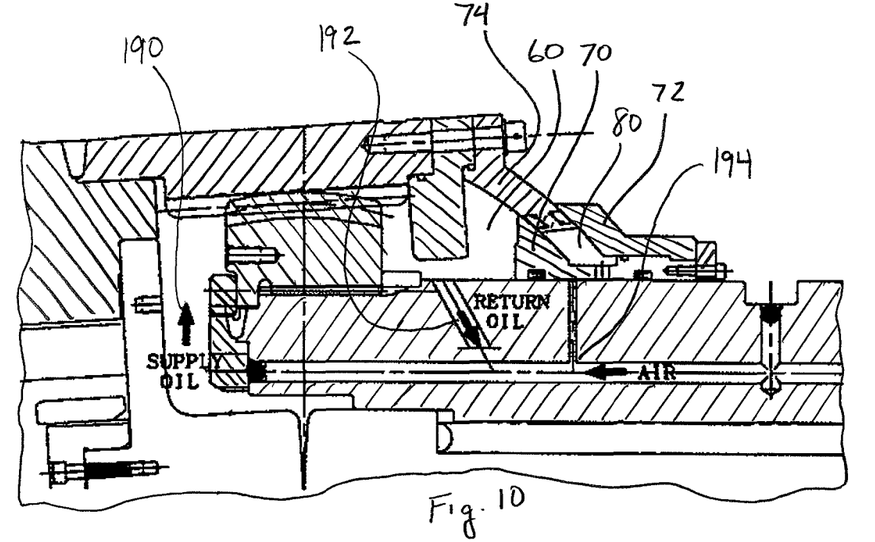
FIG. 10 is an enlarged partial view of the rolling mill end of one shaft of the embodiment of FIG. 8.

Referring now to FIG. 8, another embodiment is shown in which both the driven end 12 and rolling mill end 16 of each of the shafts 10 includes a similar interlocking ball and socket arrangement with both primary and secondary cavities on opposite sides of the primary seal. In this embodiment, the oil flow is delivered to and from the gear teeth region and primary cavity of each seal assembly (i.e., at both ends of each shaft) ends. Pressurized air is also delivered to the secondary cavity of each seal assembly (i.e., at both ends of each shaft) for the purpose described above. In this embodiment, a lube ring is not used, as oil delivery, oil return and air delivery is provided through fluid circuits in the mill pinions 160 that are coupled to drive the shafts 10. In this regard, reference is made to the enlarged partial view of FIG. 9 showing the driven end 112 of one shaft 110 with seal components 70, 72 and 74, as well as primary and secondary cavities 60 and 80. Air supply path 170 of the mill pinion is shown and delivers air to hoses 172 and 174 that feed paths 176 and 178 that lead, respectively, to the secondary cavity 80 of the rolling mill end and the secondary cavity of the driven end. In this illustrated embodiment, air path 178 is located in a cylindrical end portion of the hub gear. A driven end oil supply path 180 of the mill pinion delivers oil to a hose 182 that feeds to a shaft oil path 184 that extends to the gear region of the driven end. Oil return paths 186 of the mill pinion are also shown. A rolling mill end oil delivery path 188 of the mill pinion is also provided and feeds an oil path that extends to the rolling mill end. In this embodiment the lube ring is not needed as the hoses rotate with both the shaft and the mill pinion. FIG. 9 shows a partial enlarged view of the rolling mill end seal assembly with primary and secondary cavities 60 and 80 and oil supply flow 190, oil return flow 192 and air delivery flow 194.

It is to be clearly understood that the above description is intended by way of illustration and example only and is not intended to be taken by way of limitation, and that changes and modifications are possible.

What is claimed is:

1. A gear spindle, comprising:
   a shaft having a first gear cavity at a first end;
   an oil delivery path for delivering oil to the first gear cavity;
   an oil return path for carrying oil away from the first gear cavity;
   a first seal assembly associated with the first end of the shaft, the first seal assembly including:
      a first seal component with an outwardly facing part spherical surface,
      a second seal component with an inwardly facing part spherical surface that is spaced apart from the outwardly facing part spherical surface of the first seal component,
      a third seal component between the first seal component and the second seal component, the third seal component having both an inwardly facing part spherical surface and an outwardly facing part spherical surface, the inwardly facing part spherical surface of the third seal component in surface to surface contact with the outwardly facing part spherical surface of the first seal component to form a first sealing interface, the outwardly facing part spherical surface of the third sealing component in surface to surface contact with the inwardly facing part spherical surface of the second seal component to form a second sealing interface,
   the first sealing interface having one side in fluid communication with the first gear cavity and an opposite side in fluid communication with a secondary cavity for limiting leakage of oil from the first gear cavity into the secondary cavity,
   a fluid delivery path for delivering pressurized air to the secondary cavity for countering gear cavity pressure across the first sealing interface;
   the second sealing interface for holding compressed air in the secondary cavity.

2. The gear spindle of claim 1, wherein the shaft includes an air inlet port, one end of the fluid delivery path connected to the air inlet port and an opposite end of the fluid delivery path connected to the secondary cavity.

3. The gear spindle of claim 1 wherein the first seal assembly is mounted for axial movement along the shaft.

4. The gear spindle of claim 1, further comprising:
   a lube ring mounted about the shaft and including an oil inlet port for feeding the oil delivery path, an oil outlet port for receiving oil from the oil return path and an air inlet port for delivering pressurized air to the fluid delivery path.

5. The gear spindle of claim 4 further including a catch box aligned with the lube ring.

6. The gear spindle of claim 1 wherein the first seal assembly is configured to permit pivot of a driven component at the first end of the shaft, the first seal component and second seal component connected for rotation with the shaft, the third seal component connected for rotation and pivot with the driven component, and the secondary cavity providing a space for movement of the third seal component during pivot of the driven component.

7. The gear spindle of claim 1 wherein part of at least one of the oil delivery path or the oil return path is formed by a sealed recess in the outer surface of the shaft.

8. The gear spindle of claim 4, wherein the fluid delivery path is connected to a source of pressurized air at a pressure that substantially reduces pressure differential across the first sealing interface.

9. A drive arrangement including the gear spindle of claim 1, wherein the first end of the shaft is operatively connected to rotate a work roll that is positioned alongside a backup roll.

10. A drive arrangement including the gear spindle of claim 1, wherein the shaft has a second end coupled to be driven by a mill pinion, oil is delivered through the mill pinion to the oil delivery path, oil carried along the oil return path is delivered back to the mill pinion, and pressurized air is delivered through the mill pinion to the fluid delivery path.

11. The gear spindle of claim 1 wherein the fluid delivery path extends through a cylindrical end portion of a hub gear associated with the first end of the shaft.

12. A method of providing oil recirculation in a gear spindle including a drive shaft, the method comprising:
   providing a recirculating flow of oil to and from a gear cavity at an end of the drive shaft;
   providing a seal arrangement in connection with the gear cavity, the seal arrangement including a first seal component with an outwardly facing part spherical surface, a second seal component with an inwardly facing part spherical surface that is spaced apart from the outwardly facing part spherical surface of the first seal component, a third seal component between the first seal component and the second seal component, the third seal component having both an inwardly facing part spherical surface and an outwardly facing part spherical surface, the inwardly facing part spherical surface of the third seal component in surface to surface contact with the outwardly facing part spherical surface of the first seal component to form a first sealing interface, the outwardly facing part spherical surface of the third sealing component in surface to surface contact with the inwardly facing part spherical surface of the second seal component to form a second sealing interface, the first sealing interface having one side in fluid communication with the first gear cavity and an opposite side in fluid communication with a secondary cavity for limiting leakage of oil from the first gear cavity into the secondary cavity, a fluid delivery path for delivering pressurized air to the secondary cavity for countering gear cavity pressure across the first sealing interface, the second sealing interface for holding pressurized air in the secondary cavity; and delivering pressurized air to the secondary cavity to act against gear cavity pressure.

13. The method of claim 12 wherein pressurized air is delivered at a pressure selected to correspond to an anticipated gear cavity pressure.

14. The method of claim 12 wherein the first seal assembly is configured to permit pivot of a driven component at the first end of the shaft, the first seal component and second seal component connected for rotation with the shaft, the third seal component connected for rotation and pivot with the driven component, and the secondary cavity providing a space for movement of the third seal component during pivot of the driven component.

* * * * *